Figure 3:
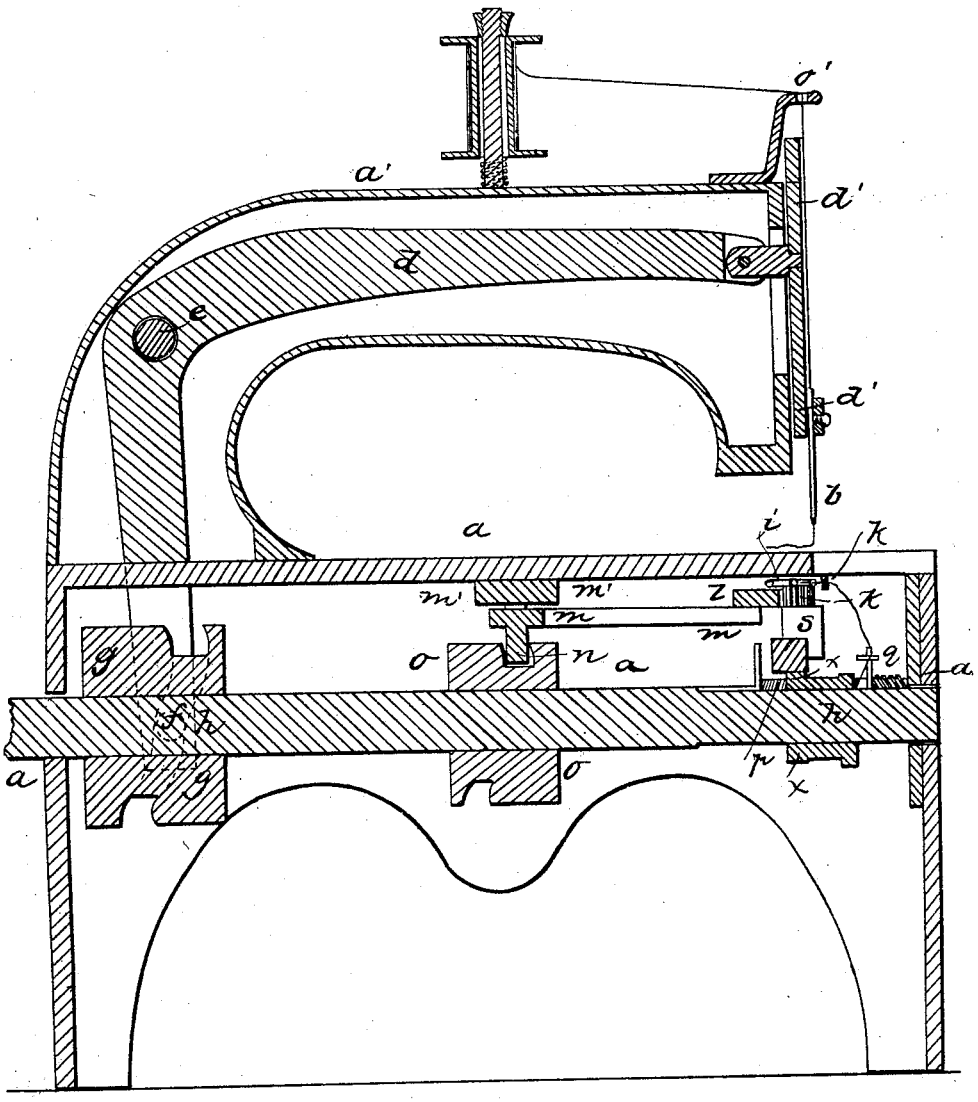

United States Patent Office

PTO - BOYERS, PA Duty Station

MISSING PAGE TEMPORARY NOTICE

PATENT #RE572 FOR ISSUE DATE 7-6-1858

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 1

N/A at Boyers 11-3-92.

Data Conversion Operation

Boyers, Pa

3 Sheets—Sheet 2.

GROVER & BAKER.

Sewing Machine.

No. 572.

Reissued July 6, 1858.

N. PETERS, Photo-Lithographer, Washington, D. C.

GROVER & BAKER.
Sewing Machine.
No. 572. Reissued July 6, 1858.
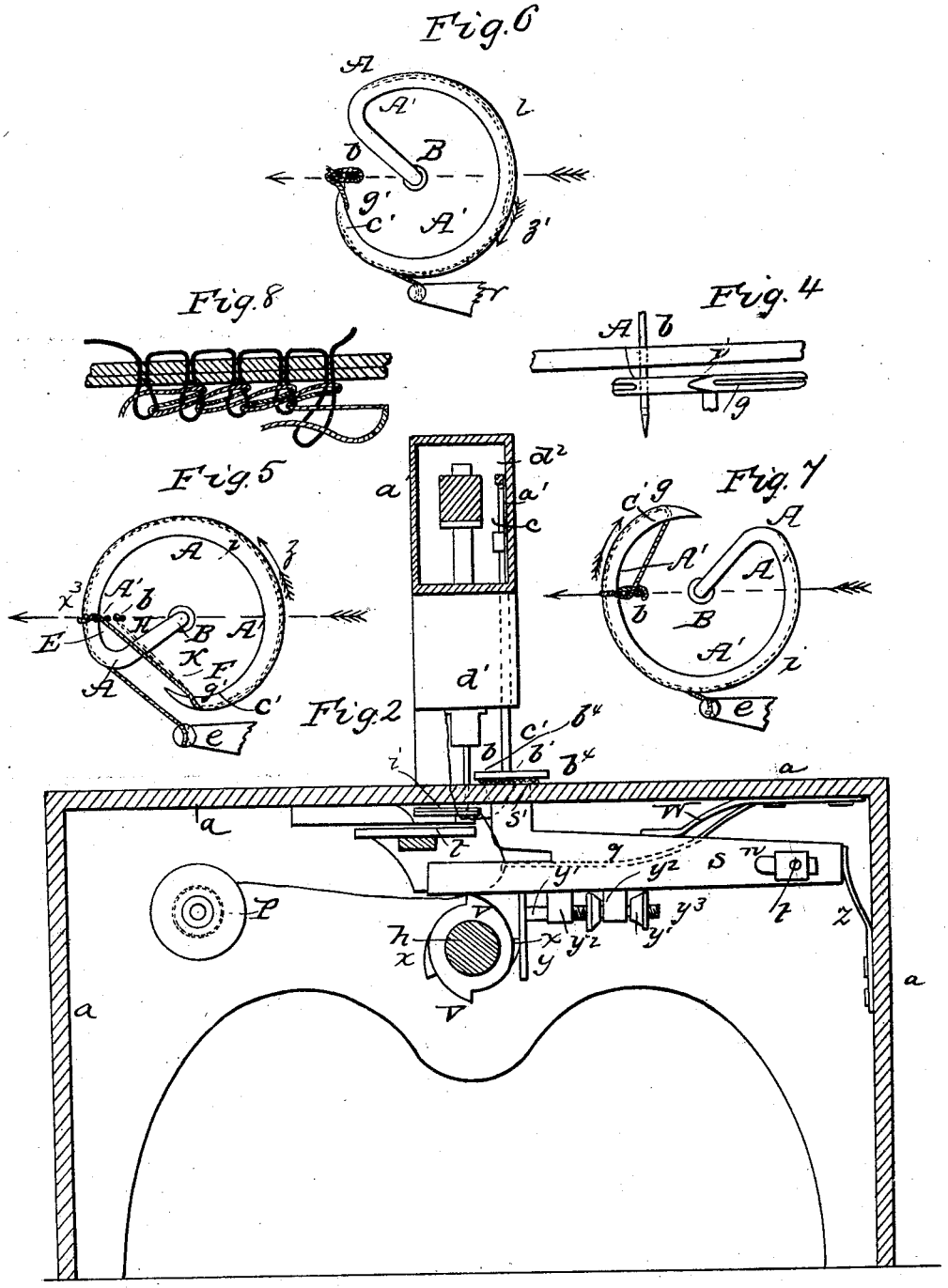
N. PETERS, Photo-Lithographer, Washington, D. C.

BEST AVAILABLE COPY

UNITED STATES PATENT OFFICE.

W. O. GROVER AND W. E. BAKER, OF BOSTON, MASSACHUSETTS, ASSIGNOR TO THE GROVER & BAKER SEWING MACHINE COMPANY.

IMPROVEMENT IN SEWING-MACHINES.

Specification forming part of Letters Patent No. 23,904, dated June 22, 1852; Reissue No. 572, dated July 6, 1858.

*To all whom it may concern:*

Be it known that we, W. O. GROVER, then of Boston, in the county of Suffolk and State of Massachusetts, and W. E. BAKER, at that time of Roxbury, in the county of Norfolk and State aforesaid, did invent certain new and useful Improvements in Sewing-Machines, for which we obtained Letters Patent of the United States, dated on the 22d day of June, A. D. 1852, which Letters Patent are inoperative and invalid on account of a defective, insufficient, and false description and erroneous specification of claim; and be it further known that we do hereby set forth and make known the following as a full, clear, and exact amended description and specification of claim of our invention, as aforesaid, not claiming as of our own invention the apparatus for feeding the cloth herein described and represented, but only claiming it as of our own invention when combined in the manner substantially as shown in the following description and accompanying drawings of a machine which embodies our invention, with appropriate apparatus for forming a double-looped stitch by means of a perforating-needle and an eye-pointed instrument which enters and holds loops of thread furnished by the perforating-needle.

In the drawings, making part of this description, Figure 1 is a plan of the machine with some parts supposed to be removed, and showing in dotted lines the apparatus for moving the non-perforating needle. Fig. 2 is a vertical section taken on the line A B of Fig. 1, and Fig. 3 is also a vertical section, taken on the line C D of Fig. 1, Figs. 4, 5, 6, and 7 being views of the needles in various positions, and Fig. 8 being a representation of the stitch made by the machine, the threads being represented as left slack, so as to show the manner in which they are entwined, all these figures being on a large scale, and the large arrows showing the line of progression of the cloth.

Prior to the date of this invention a double-looped stitch, made by the interlocking of two threads, one of which was supplied by a needle perforating the material to be sewed, and the other of which was furnished and governed by a non-perforating eye-pointed instrument, was well known to those skilled in the art of sewing by machinery, the offices of the latter instrument being to hold a loop open for the entrance of the perforating-needle and its thread, and then to put its own thread through the loop of thread furnished by the perforating-needle and hold that loop of the perforating-needle for a proper length of time. The machines for making this stitch were imperfect in their operation chiefly on account of the uncertainty of the non-perforating needle in opening a loop of its own thread, and, secondly, because when the loop thereof was opened it was not held in such position as would always insure the passage of the perforating-needle through it; but, on the contrary, the perforating-needle at times passed outside of the loop held for its reception, and at others split the thread of the non-perforating needle. These machines were, further, defective in that they were not provided with a feed-motion sufficiently good to insure their utility when applied to sew all sorts of seams. Although in a machine devised and invented by ourselves, the perforating and non-perforating needles had been combined with a feed-motion which grasped the cloth or material to be sewed without the cloth being positively attached to any moving parts of the apparatus. These being the defects, our invention has for its object the remedying of them; and to this end we now declare that the nature of the first part of our invention consists in combining with an eye-pointed perforating-instrument a curved or crooked non-perforating instrument so operating and located that it shall, by virtue of its curve and motion, spread a loop of thread, by a portion of such loop being drawn in a straight line, or nearly so, between two parts of the instrument, while the perforating-instrument shall enter between such portion of the loop and the non-perforating instrument itself, the two acting, substantially as specified, to make a double-looped stitch; and the nature of the second part of our invention consists in a contrivance, substantially such as hereinafter specified, acting in combination with an eye-pointed perforating-instrument, whereby the loop of that instrument held by the non-perforating instrument shall be moved away from the place in which it was originally seized, and prior to its release from the non-perforating instrument, substantially in the manner and for the purposes specified; and the nature of the third part of our invention consists in combining with an eye-pointed perforating-instrument a non-perforating instrument which shall by virtue of its shape and motion not only spread and hold a loop of its own, (a portion of such loop being straight and leading from one point to another in the needle,) but shall also carry the loop of the perforating-instrument, which it at times holds away from the points or location at which it was seized, the combination being substantially such and for the purpose specified; and the nature of the fourth part of our invention consists in combining with a perforating and a non-perforating instrument for making a double-looped stitch a feed-motion in which the material to be sewed is grasped between two surfaces, to neither of which it is attached, and one of which surfaces has motion, substantially as specified, in four directions—namely, to and from the other surface and in and contrary to the line of motion of the material to be sewed, such feed-motion being substantially such as is hereinafter specified.

The machine represented in the drawings, and now specially to be described, is a type embodying these improvements in a suitable and convenient form; and in the drawings the frame-work and bed-plate of the machine is shown at *a a a*. A main shaft, *h*, supported in proper journals, lies under the bed-plate, and upon this shaft are fixed three cams, *g g*, *o o*, and *x v*, the former for giving motion to the perforating instrument, which we will hereinafter call the "upper needle," the second giving motion to the non-perforating instrument, which we shall term hereinafter the "lower" or "curved needle," and the third actuating the feeding apparatus. From the bed-plate rises a stationery bent standard, *a′ a′*, in the present instance hollow and containing a bell-crank, *d d*, pivoted at *e*, and engaging at one end with the cam-track of *g g* by a stud, *f*. This bell-crank is, by means of a slot and pin, or in any proper way, connected to a needle-bar, *d′ d′*, capable of sliding up and down in proper ways, the connection as a whole being such that the revolution of the main shaft will cause the needle-bar and the eye-pointed needle *b*, attached to it, to move up and down, so that the needle shall perforate the material to be sewed, carry its eye below the cloth to some distance, and rise again, so that its point is above the cloth. Underneath the bed-plate, and pivoted thereto, at *m′*, is another bent lever, *m m*, one end of which carries a rack, *l*, and the other a stud, *n*, which enters the cam-track of *o o*, and the rack engages with a pinion, *k*, having a proper shaft projecting from the lower end, which is supported by an appropriate step or journal-box. To this pinion is attached the lower needle, *i*, the plane passing through such needle being parallel, or nearly so, with the material to be sewed, and the whole connection being such that the needle reciprocates or swings to and fro as the main shaft is rotated. The feed-motion in this machine consists of a bar, *s s′*, having in one end a slot, *u*, which embraces a pin, *t*, attached to some convenient part of the frame-work, and on this pin the bar can both oscillate up and down and slide to and fro. One end of this bar rests upon the cam *v v*, being pressed down by a spring, *w*, while at another part the bar is bent upward, having a surface, $s^3$, which can pass at times just through a slit or aperture in the bed-plate. This bar is also forced toward the main shaft by a spring, *z*, and has attached to it a projection, *y*, which this spring causes to bear against a cam, *x x*. The projection *y* is fastened to a rod, *y′*, which passes through two studs, $y^2$ $y^2$, secured to the feed-bar, and is screwed, as at $y^3$ $y^3$, having on the screwed parts two nuts, $y^4$ $y^4$, the arrangement being such that the projection *y* may be set at different points along the bar *s s′*. In the standard, in proper guides, is a rod, *c c′*, free to slide up and down, and held down by a spring, $d^2$. This rod has attached to it a presser-foot, *b′ b′*, with a surface, $b^4$, just above the surface $s^3$ $s^3$.

Upon the standard, or attached to any suitable part of the machine, is an apparatus for supporting a thread-bobbin and preventing the thread from passing to the needle, except under tension, in a manner usual in sewing-machines, and thread from this bobbin is to be passed through a guide-hole, *o′*, and through the eye-pointed upper needle. Another spool, *p*, is supported in a similar manner underneath the bed-plate, and from it a thread passes through a spring-guide, *q*, and then through a hole in a guide, *r*, which hole is at the same elevation as the center of the needle, and then through the eye of the curved needle. This needle has a groove leading from its eye *g′* to its heel or angle at A on the outer periphery of the needle, and thread lies in part or whole of this groove during the operation of the machine. When thus threaded the machine is ready for use, and cloth or other material to be sewed is to be placed upon the bed-plate, with a portion thereof, in the line of the intended seam, grasped between the feeding apparatus. We will now suppose the machine threaded with a red upper and blue lower thread, and the shaft to be revolved. The upper needle will then commence to descend, and as it descends passes, as in Fig. 5, between the lower thread and the body of the needle, so that the upper needle has then a turn of the lower thread around it, widely spread. After descending with its point below the plane of the lower needle it presses. The lower needle then turns in the direction of the arrow *z*, Fig. 5, and winds the turn or loop of its thread tolerably closely around the upper needle, the whole then being as in Fig. 6. The upper

United States Patent Office

PTO - BOYERS, PA Duty Station

MISSING PAGE TEMPORARY NOTICE

PATENT # Re 572 FOR ISSUE DATE 7-6-1858

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p. 3 of text + rest.

Data Conversion Operation

Boyers, Pa